May 10, 1927.   A. TAMMEO   1,628,625

WING STRUCTURE FOR AIRCRAFT

Filed May 26, 1926    8 Sheets-Sheet 1

Inventor
ALDO TAMMEO

By
Attorney

May 10, 1927.   A. TAMMEO   1,628,625
WING STRUCTURE FOR AIRCRAFT
Filed May 26, 1926    8 Sheets-Sheet 5

Inventor
ALDO TAMMEO

By
Attorney

May 10, 1927.  A. TAMMEO  1,628,625

WING STRUCTURE FOR AIRCRAFT

Filed May 26, 1926    8 Sheets-Sheet 7

Inventor
ALDO TAMMEO

By
Attorney

May 10, 1927.  A. TAMMEO  1,628,625

WING STRUCTURE FOR AIRCRAFT

Filed May 26, 1926   8 Sheets-Sheet 8

Inventor
ALDO TAMMEO

By

Attorney

Patented May 10, 1927.

1,628,625

UNITED STATES PATENT OFFICE.

ALDO TAMMEO, OF GENOA, ITALY.

WING STRUCTURE FOR AIRCRAFT.

Application filed May 26, 1926, Serial No. 111,850, and in Italy May 28, 1925.

This invention relates to improvements in and relating to the wing structure of aircraft, and is especially applicable to that type of aeroplane described in my former application Serial No. 24,553.

The object of this invention is to enable the resultant angle of incidence of the wing surfaces to be varied and so enable a variation in the mean resultant coefficient of thrust of the aeroplane to be obtained with the result that the flying speed can be varied within a wide range at constant engine speed.

According to this invention additional wing surfaces are provided adapted to have a variable angle of incidence and means for effecting said variation.

In an aeroplane having a plurality of main wing surfaces, means are preferably provided for varying the angle of incidence of one of the main wing surfaces and the additional wing surfaces in the same or opposite directions. The additional wing surfaces comprise a horizontal and a vertical portion, the horizontal portion consisting of a fixed part and a movable part adapted to have a variable angle of incidence.

The invention is diagrammatically illustrated in the accompanying drawings in which.

The aeroplane comprises essentially a biplane construction formed in two detachable parts, one of which parts being connected to each side of a central fuselage, and consists of two main wing surfaces, the upper one of which is of considerable breadth and thickness (Figures 1, 7, 8, 9, 10) and is rigid and fixed, its angle of incidence during flight being constant with respect to the plane of flight, whilst the lower wing 2 is of reduced thickness and breadth and its angle of incidence to the plane of flight can be varied by turning it through an angle of from 0° to 16° about its main spar.

Figure 3:
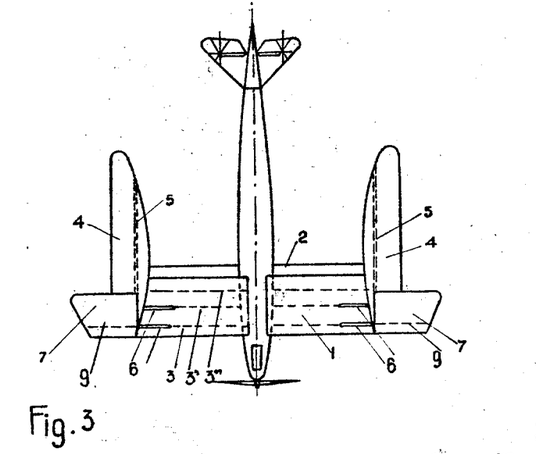
Figure 9:
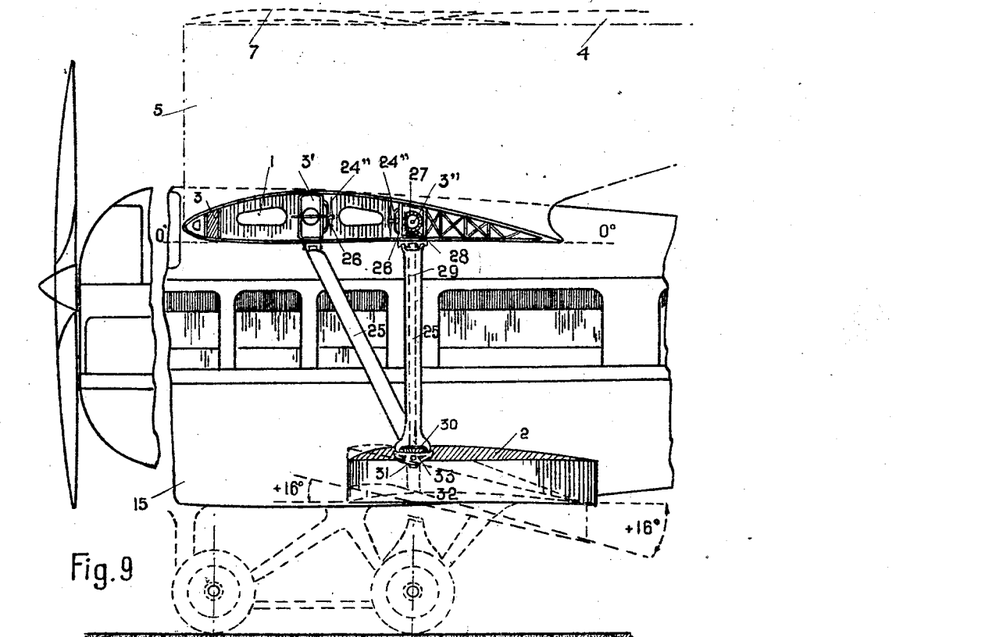
Figure 9 is a similar view showing the main wing in section.
Figures 10, 11:
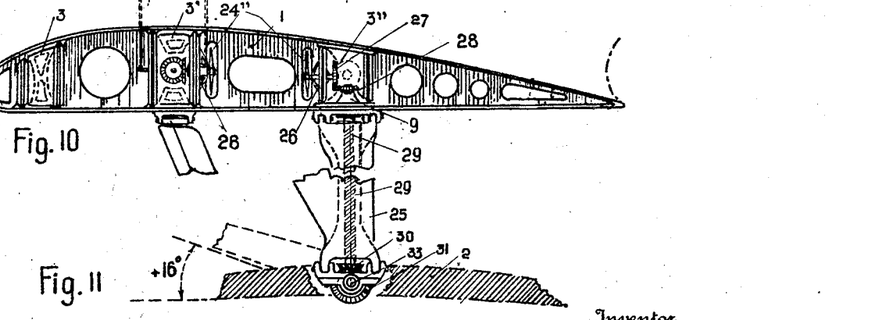
Figure 10 shows on a larger scale a transverse section of the main wing.
Figure 11 is a detailed sectional view of the lower wing.

The supports for the main wing are contained in the section of the wing and comprise for example three parallel stays 3, 3', 3'', Figures 3, 9 and 10, formed preferably of rigid steel rods suitably connected to one another.

The two (or more) superposed wing surfaces are connected to one another by means of two or more pairs of struts preferably of elliptical section and arranged in a V in the longitudinal vertical plane.

At the ends of the wing 1 are arranged two symmetrical pairs of self-stabilizing planes connected to one another in such a way as to form a sort of T, and each comprising a horizontal plane 4 and a vertical plane 5 of considerable depth, parallel to the axis of symmetry of the machine. The planes 5, 5, are arranged at right angles to the wing 1 and are rigidly connected to the latter by means of two pairs of diagonals 6 thus forming an essential to the rigidity of the machine.

The horizontal planes 4, 4, comprise two entirely independent parts 7 arranged one behind the other, the front one of which has a transverse spread greater than the rear and is of the same breadth and cross section as the lower wing 2.

Figure 15:
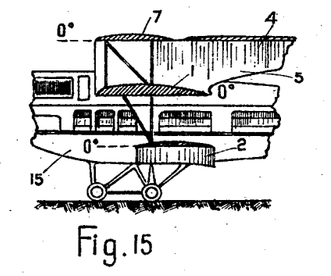
Figure 16:
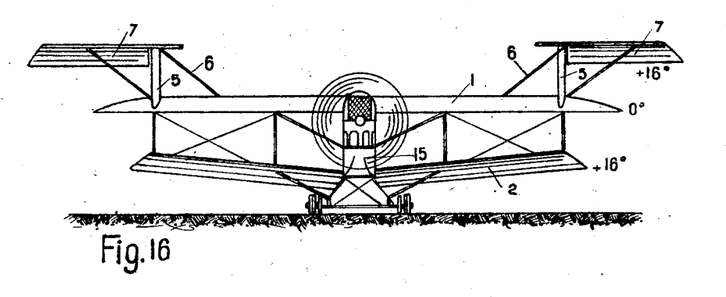
Figure 17:
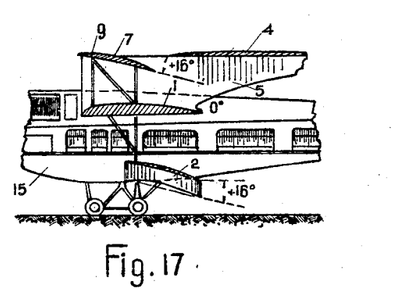

Moreover, whilst the rear parts 4, 4, are horizontal and of a constant very small thickness and rigidly connected to the vertical planes 5, 5, by diagonals or other similar means they act as self-stabilizing planes. The parts 7, 7, act as supporting wing surfaces and are mounted in such a way as to rock about their fore spar 9 (Figures 3, 15, 17) and so varying their angle of incidence with respect to the plane of flight (instantaneously or gradually) between 0° and 16° in conjunction with the lower wing surface 2 of the biplane.

They may moreover vary their angle of incidence with respect to the axis of the propeller independently of the lower wing surface by rocking from 0° to ±16°.

The variation in wing incidence between 0° and +16° of the upper lateral wing surfaces 7, 7, (see Figures 14, 15, 16 and 17) in conjunction with the variation of incidence of the lower wing surfaces 2 of the biplane permits variation (in decreasing or increasing within very great limits) in the speed of the aeroplane to be obtained at a constant engine speed and also variation in the lifting power of the wings.

Figure 20:
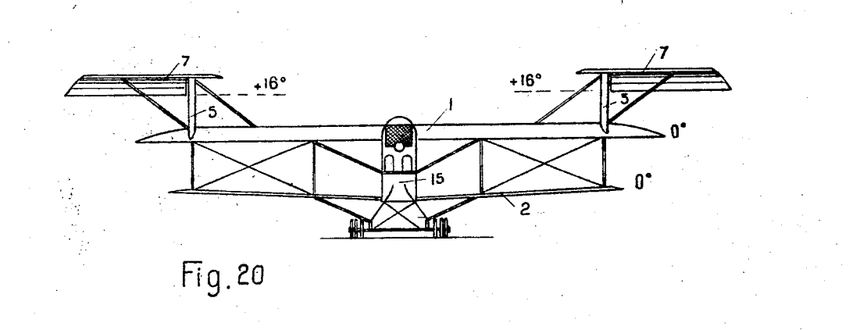
Figures 20 and 21 show respectively a front and perspective side view of the apparatus in another position of flight.
Figure 21:
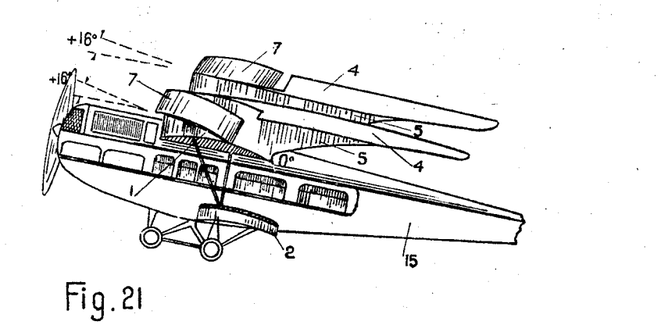

On the other hand (see Figures 20 and 21) the joint rotation of the two lateral planes 7, 7, from 0° to +16° produces breakage of the automatic longitudinal balance (assured by the self-stabilizing fixed planes 4, 4, about the axis of pitching) and considerably facilitates ascent and descent during flight.

Figure 18:
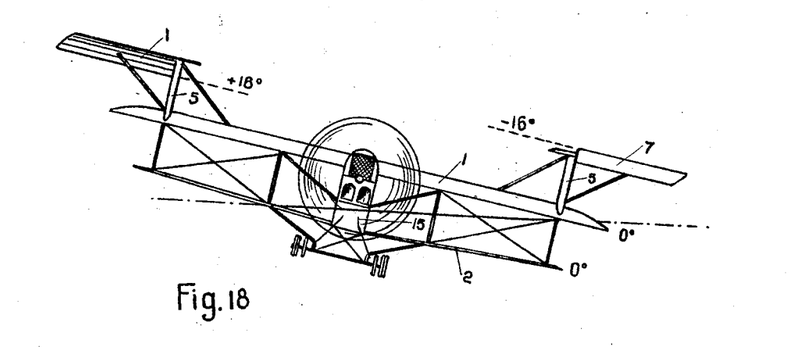
Figures 18 and 19 are a front and side view of the aeroplane in one position of flight.
Figure 19:
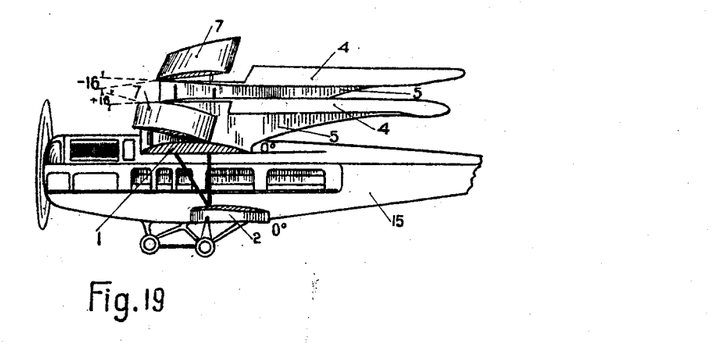

Finally the opposite rotation of the two lateral planes 7, 7, from 0° to +16° (see Figures 18 and 19) produces the almost instantaneous breakage of the automatic transverse equilibrium (assured by the self-stabilizing planes 4, 5, about the rolling axis) thus facilitating all turning movements to the right or left of the aeroplane.

By means of the said partial variation in wing incidence the flight of the aeroplane takes place with a mean resultant angle of incidence and can be varied for a minimum of 0° to a maximum dependent, not only on the maximum angle of incidence of the different mobile surfaces but also on the ratio between the main fixed wing surfaces and the surfaces having a variable incidence.

Figure 1:
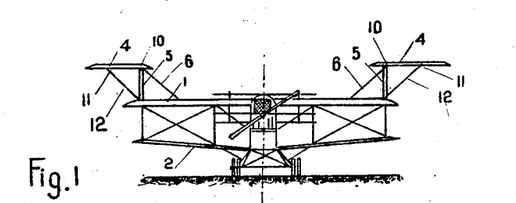
Figures 1, 2 and 3 are respectively an end, side and plan view of an aeroplane.
Figure 2:
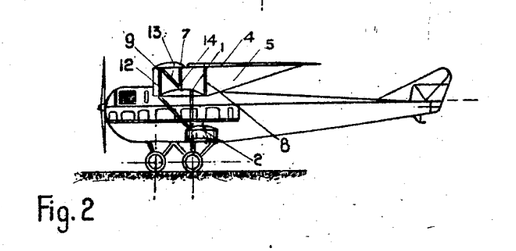

Rotation of the wing surfaces 7, 7, takes place about their fore spar 9 parallel to the axis of pitching, and supported by two couplings or pivoted joints of which one is situated at 10 in the vertical plane 5 and the other at 11, at a distance apart of about two thirds of the length of the spar on the top of a fixed frame consisting of two braces 12 and 13 (Figures 1, 2,) arranged in an inverted V in the longitudinal plane.

Rotation of each of the said surfaces is obtained through a worm or similar gear causing the rise or fall of a second V frame 14 (Figure 2) arranged in a transverse plane, the lower apex of which is pivotally connected to an upright, sliding vertically in a guide in the corresponding vertical plane 5, whilst the ends of the arms of the V are pivoted at two points to the rear spar from each of the wing surfaces 7, 7.

The present invention comprises moreover a control and transmission system for the rotation of the moving surfaces 2 and the upper lateral surfaces 7, 7, the controls being situated inside the fuselage and the transmission members in the interior of the wing surfaces 1 and 2 and the uprights connecting them, as well as with regard to the upper lateral surfaces mentioned above, in the interior of the vertical planes 5, 5.

Figure 4:
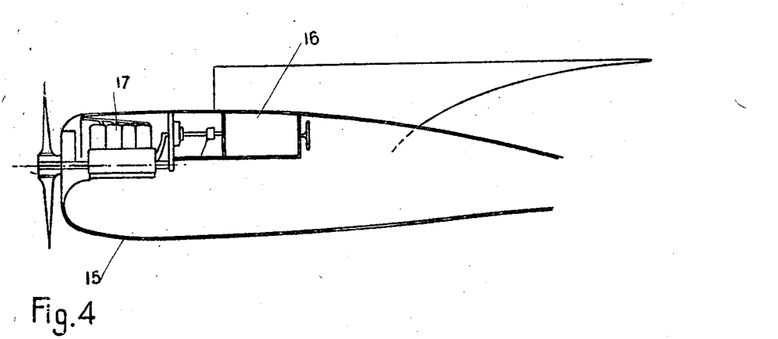
Figure 4 is a part longitudinal section through the fuselage.

Inside the fuselage 15, (Figure 4) is situated a servo motor 16 controlled as desired either through the principal motor 17 or through a specially provided motor or by suitable hand actuated mechanism.

The coupling of the motor with the servo motor is effected by means of a clutch 18 (Figure 5) one part of which is fixed to a toothed wheel 19 in mesh with a smaller pinion 20 fast on the shaft of the aeroplane engine, with the object of making the transmission of the driving shaft of the motor to the servo motor as rapid and flexible as possible, and at the same time reducing the high speed of the former to a suitable speed for the first degree of the servo motor.

The latter comprises gear boxes 21, 22, enclosing reduction gear with similar arrangements for reversing and changing speed of the motors and reversing either at the same time or automatically the sense of rocking of the moving surfaces of the wings.

Figures 5, 6:
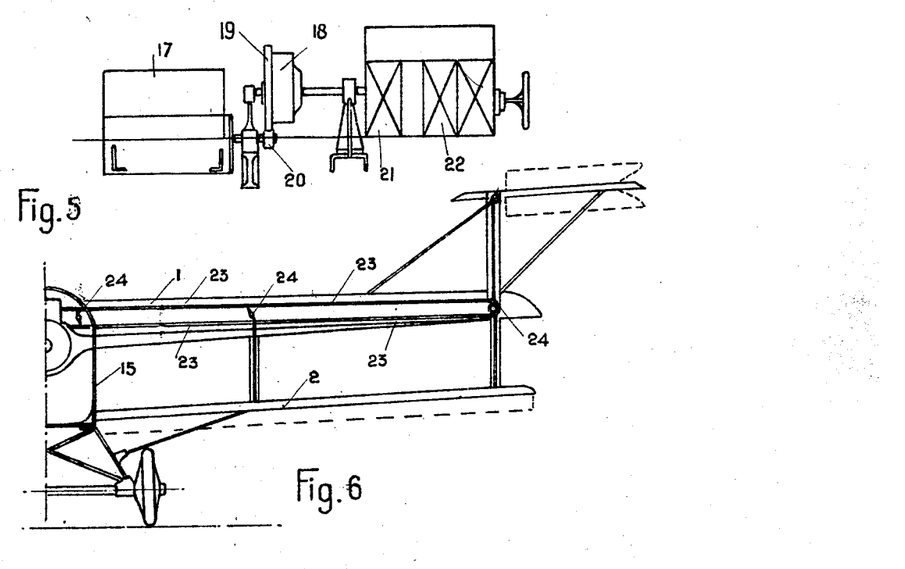
Figure 5 is a detail view of the control mechanism.
Figure 6 is a transverse section on a larger scale of one side of the machine.
Figure 7:
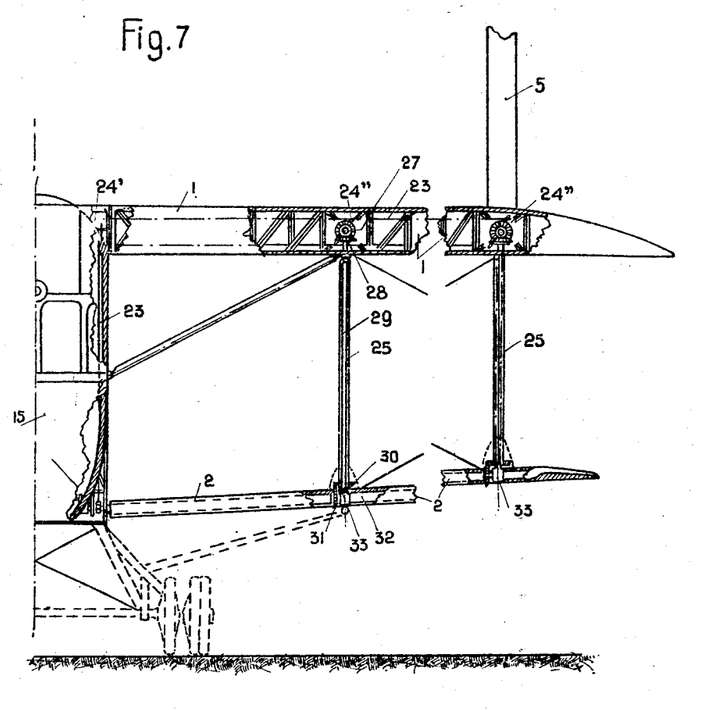
Figure 7 is a front view partly in section of a part of the main wing.
Figure 8:
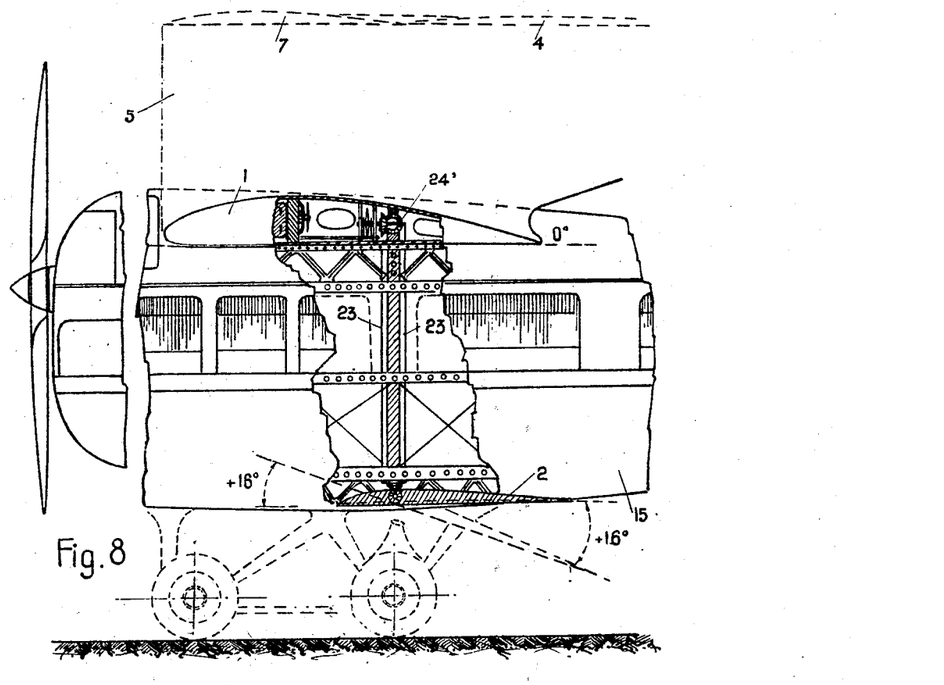
Figure 8 is a side view partly in section of the front portion of the aeroplane.
Figures 12, 13:
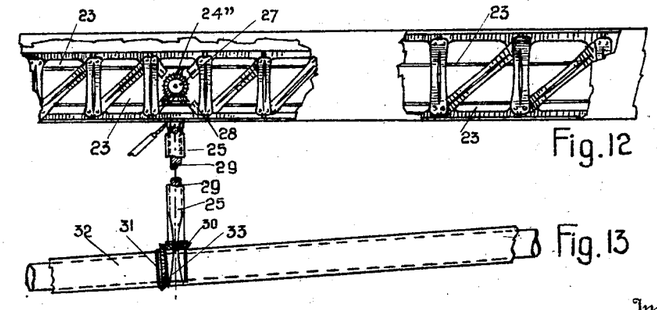
Figures 12 and 13 are corresponding part sectional longitudinal views.
Figure 14:
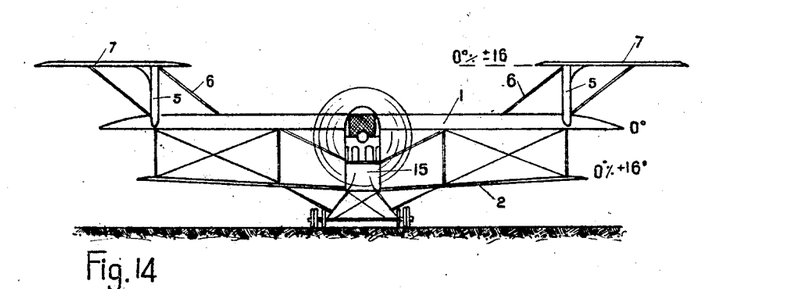
Figures 14 and 15, 16 and 17 show respectively a corresponding front and partial side view of parts of the machine in two different flying positions.

When the desired mean angular speed of rotation of the movable wings 2 and 7 has been obtained by means of the servo motor mentioned above, it is transmitted from the servo motor to the wing surfaces (as shown in Figures 6, 7 and 12) through four tension or push rods 23 carried by rocking arms 24 and located in the section of the fixed wing 1 and the side walls of the fuselage 15, forming linked parallelograms that are deformed during movement.

There are six rocking arms shown in the section of the wing 1 of which the central pairs 24' are situated in the section of attachment of wing 1 to the fuselage 15 (see Figures 7 and 8), the four rods 24'' being arranged in pairs in those sections of the wing located in alignment with the vertical rods 25 connecting the upper and lower wings 1 and 2 (Figures 7, 9, 12 and 13).

The oscillatory movement of the arms 24' and 24'' is transmitted to the main longitudinal spar of the lower moving wings 2, and upper lateral wings 7, by pairs of bevelled toothed pinions, or any other suitable arrangements.

The arms 24' and 24'' pivot in a vertical plane about supports 26 on the spar 3'' of the wing 1 (see Figures 9 and 10) and each of them is fast with a bevelled pinion 27 meshing with another pinion 28 fast on the end of a shaft 29 free to rotate in the corresponding vertical rod 25 (Figures 7, 9, 10, 11, 12 and 13).

The arms 29 carry at their lower ends bevelled pinions 30 meshing with pinions 31 fast on a main longitudinal spar 32 of the lower moving wing 2 (Figures 7, 9, 11 and 13).

The above mentioned pinions are held in engagement by means of pivoted supports 33 (Figures 9 and 11) carried by the respective rods 25 and rigidly connecting the latter to the axis of the longitudinal spar 32 of the lower moving wing 2.

In place of this transmission system of connecting rods and toothed pinions described above, any other suitable arrangement, such as cables, rack and pinion, endless screw rod, and like means, may be employed.

A similar system is provided for warping the upper lateral wings 7, the transmission members, however, being carried inside the vertical self-stabilizing planes 5.

As mentioned above, warping movement of the upper wings 7 may be effected in conjunction or in disjunction with (as in the case of the breakage of the automatic stability of the machine, Figures 18, 19, 20 and 21), the rocking of the lower movable wings 2 (which will take place in view of the change of speed, or variation in speed at constant engine speed, or correction of the coefficient of thrust or suspension, Figures 14, 15, 16 and 17).

These movements are effected through the necessary control levers in the pilot's cabin and controlling the servo motor contained in the fuselage 15 of the aeroplane.

What I claim is:—

1. In aircraft, the combination with an upper main wing surface and a lower main wing surface of a smaller depth and section than the upper wing surface, of additional wing surfaces of the same depth and section as the lower wing surface, and means for varying the angle of incidence of the lower main wing surface and the additional wing surfaces.

2. In aircraft, the combination with a plurality of main wing surfaces, of additional wing surfaces comprising a horizontal and a vertical portion, the horizontal portion consisting of a fixed part and a movable part adapted to have a variable angle of incidence, and means for effecting the variation of the angle of incidence of said movable part and one of said main wing surfaces.

In testimony that I claim the foregoing as my invention I have signed my name this 10th day of May, 1926.

ALDO TAMMEO.